April 16, 1940.   R. H. ALLDRITT   2,197,446
DOG RACING LURE APPARATUS
Filed Aug. 13, 1936   4 Sheets-Sheet 2
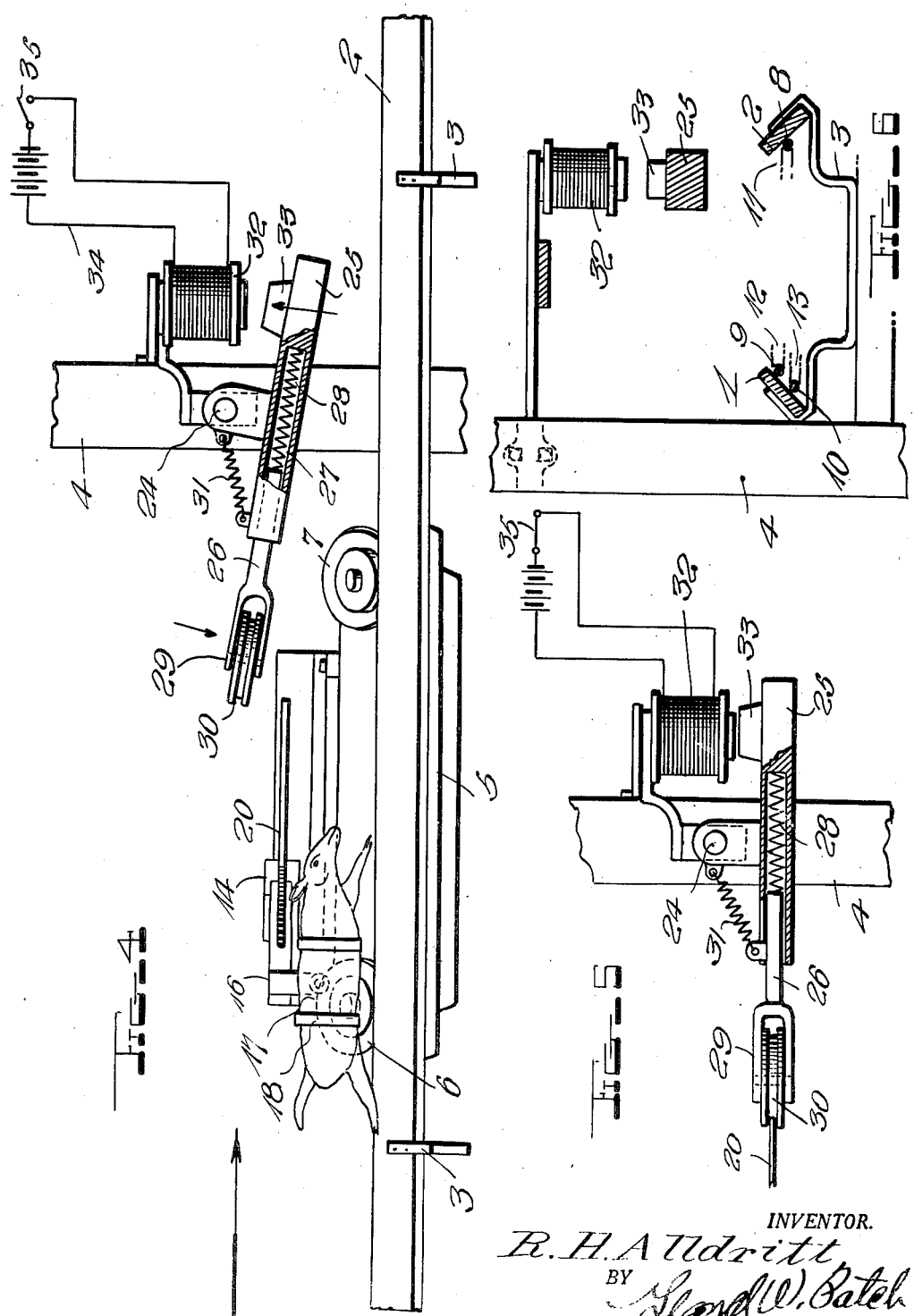
INVENTOR.
R. H. Alldritt
BY Lloyd W. Patch
ATTORNEY April 16, 1940.  R. H. ALLDRITT  2,197,446
DOG RACING LURE APPARATUS
Filed Aug. 13, 1936  4 Sheets-Sheet 3
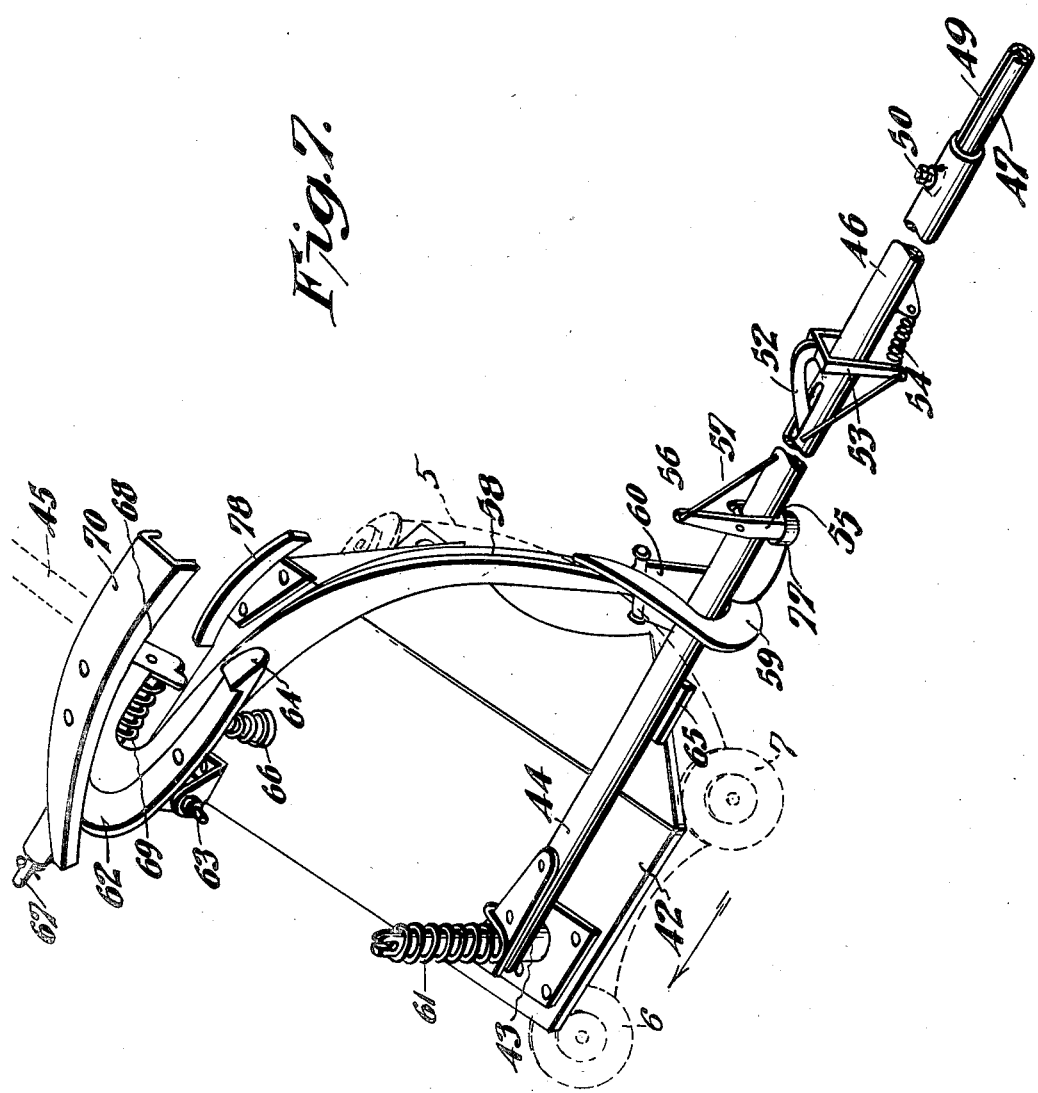
Inventor
R. H. Alldritt
By Lloyd W. Patch
Attorney April 16, 1940. R. H. ALLDRITT 2,197,446
DOG RACING LURE APPARATUS
Filed Aug. 13, 1936 4 Sheets-Sheet 4
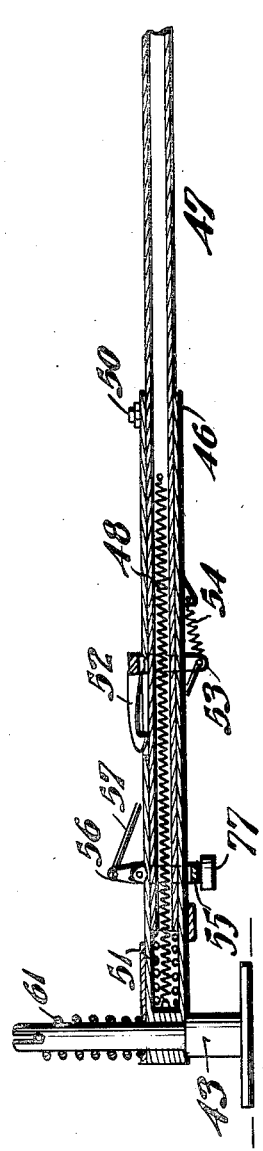
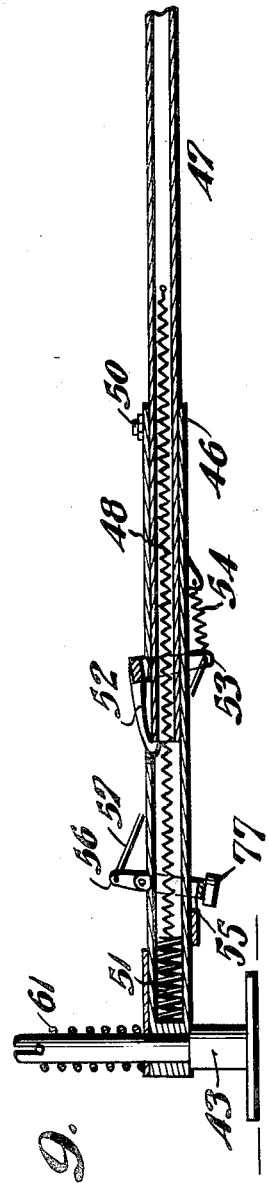
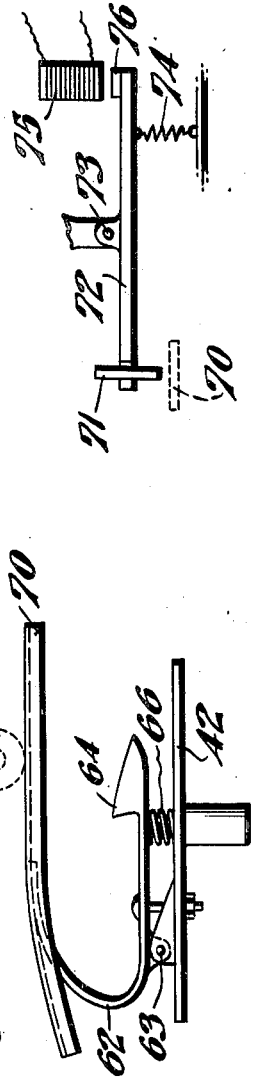
Inventor
R. H. Alldritt
By Lloyd W. Patch
Attorney Patented Apr. 16, 1940

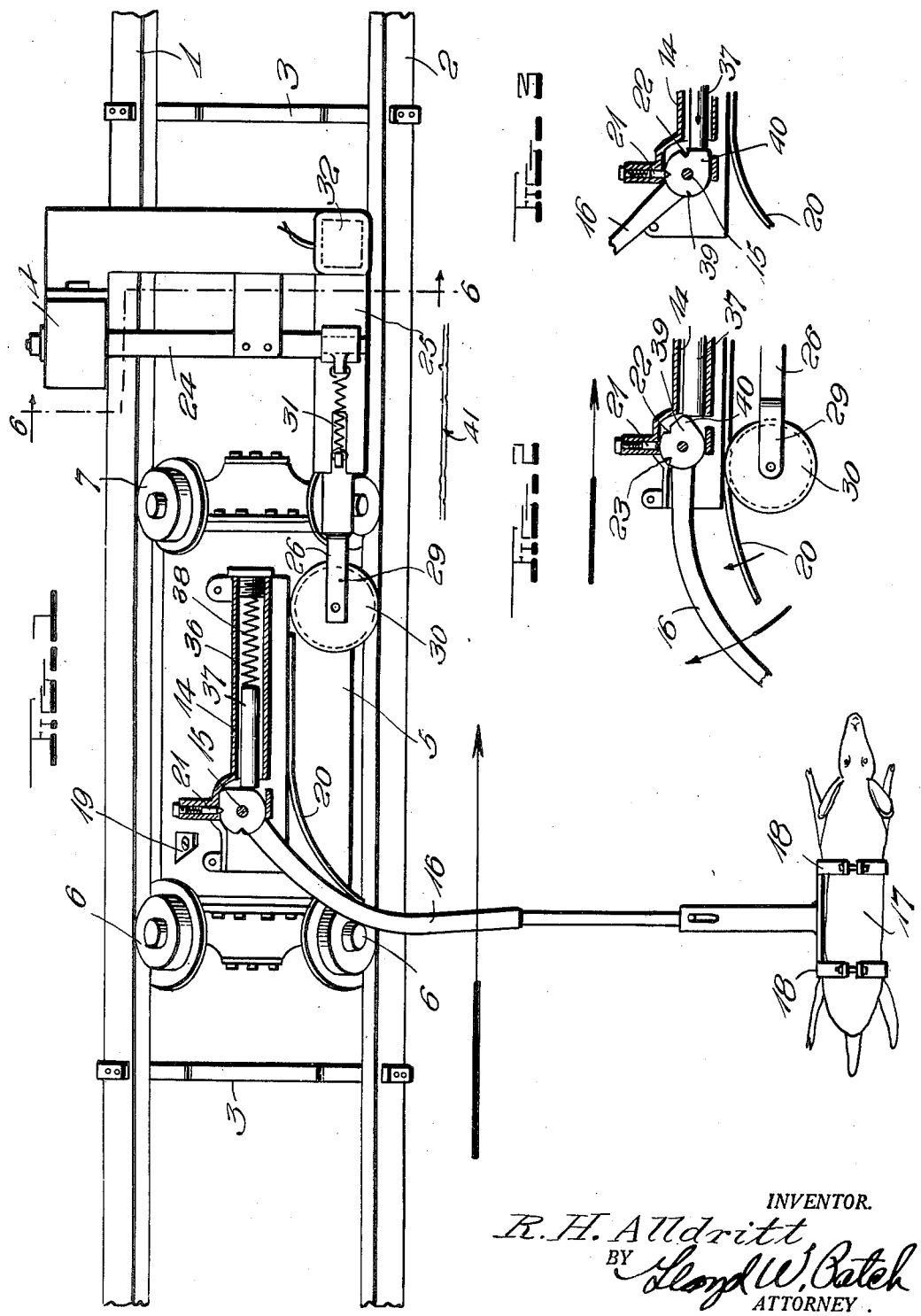

2,197,446

UNITED STATES PATENT OFFICE 2,197,446

DOG RACING LURE APPARATUS

Roy H. Alldritt, Miami, Fla.

Application August 13, 1936, Serial No. 95,896

4 Claims. (Cl. 272—4)

My invention relates to dog racing lure apparatus, and particularly to a device of this character intended and adapted to carry and move a rabbit, or other dog racing lure along or over the course of a dog racing track, and to actuate and control the lure.

An object is to provide a device of this character with which the lure is carried and is moved in a relation to urge the dogs along the length of the racing course, and is then removed from the position adjacent to the race course, substantially at the end of the course, to thus remove the urge or incentive for the dogs to continue past the end of the race course.

Another object is to provide means to carry a rabbit or other lure in a most attractive and enticing position and relation over and along the racing course of the dog track, which means is movable to permit retraction to remove the rabbit or lure entirely from the race course and from a position over or immediately adjacent to the track.

Still another object is to provide means within the control of an operator by which the rabbit or lure is moved to the inoperative or non-luring position.

A further object is to so construct and mount the parts that when the racing lure has been carried to a predetermined point, and the operator or person in control has set the retraction control, the lure will be substantially instantaneously withdrawn or removed from over the dog racing track, and will be brought to a position out of the line of vision of the racing dogs.

Yet another object and purpose is to so construct the retracting means that the lure may be normally carried and moved at a point somewhat extended laterally from the supporting car or carriage, and when the parts are retracted the lure and supporting parts therefor are also retracted toward the car or carriage to thus relieve the overbalancing effect and weight.

With the above and other objects in view, which will be apparent to those skilled in the art, and will appear from the drawings and specification, my invention includes certain novel features of construction and combinations and arrangements and assemblies of parts which will now be described with reference to the drawings, and will then be pointed out in the claims.

In the drawings:

Figure 1 is a view in top plan, with parts in section, showing a fragmentary portion of a track structure having my improved dog lure carrier associated therewith.

Fig. 2 is a fragmentary sectional view of the lure retracting means.

Fig. 3 is a view similar to Fig. 2 illustrating the completely retracted relation.

Fig. 4 is a view in side elevation of the structure illustrated in Figure 1.

Fig. 5 is a fragmentary and partial sectional view of a portion of the structure illustrated in Fig. 4 and showing the same in operative position.

Fig. 6 is a fragmentary sectional view taken substantially on line 6—6 of Figure 1.

Fig. 7 is a fragmentary perspective view illustrating a modified construction and adaptation of my invention showing the lure carrying arm in trailing position and retracted.

Fig. 8 is a longitudinal sectional view through the lure carrying arm of Fig. 7 as it will appear when retracted.

Fig. 9 is a view similar to Fig. 8 showing the lure carrying arm extended.

Fig. 10 is a fragmentary detail view showing the means for holding the lure carrying arm in the extended or operative position.

Fig. 11 is a fragmentary detail view of an electrically energized trip means suitable for use in tripping the parts as shown in Fig. 10.

With the adaptation illustrated in Figs. 1 through 6, the track rails 1 and 2 are mounted on any suitable support structure, as illustrated at 3, which supporting structure can be carried by posts 4, or other suitable members or structure. The dog racing course or dog track will be made of any desired size and form, and the track rails 1 and 2 will be mounted in substantially parallel relation to one side of the dog racing track or course, to substantially follow the contour of the course.

A carriage 5 is mounted on flanged wheels 6 and 7, which flanged wheels travel on the track rails 1 and 2. This carriage 5 may contain or support an electric motor, or other suitable driving means, by which one or both sets of wheels 6 and 7 can be rotated to cause the carriage or car structure to travel along the length of the track rails 1 and 2. As shown in Fig. 6, trolley wires or contact rails 8, 9 and 10 can be provided on the track rails 1 and 2, and contact shoes 11, 12 and 13 can be provided on the carriage of car 5 to bear against the respective trolley wires or rails. As electrically propelled carriages or cars are well known to those skilled in the art, no attempt is here made to illustrate in detail any particular motor arrangement and driving connection. However, as three trolley wires or rails are shown it will be appreciated that a current control can be accomplished for forward and reverse operation of the carriage or car, and also that electrically actuated or other brake mechanism and means can be provided for the carriage or car and can be controlled through one of the trolley circuits as described. Electrically actuated and controlled brake means are common, and also control switches and control circuit arrangements are well known, in view of which no particular structure or adaptation is here illustrated.

The carriage or car 5 has mounted thereon and carried thereby a supporting case 14, which supporting case at one end has a pivot pin 15, on which a lure carrying arm 16 is swingably mounted. This lure carrying arm is adapted to be swung to a position to extend laterally, substantially as shown in Fig. 1, in which position the rabbit 17, or other lure, is supported and is carried at a distance laterally from the track rails 1 and 2, and the arm 16 is swingable to a second position in which the arm extends substantially rearwardly from the car or carriage 5 and the lure or rabbit 17 is disposed substantially over and above the track rails 1 and 2.

The arm 16 has at its outer end a harness 18, or other means by which a rabbit or other lure can be mounted and will be carried, and the car or carriage 5 is preferably provided with a stop or button 19 which will limit inward swinging movement of the arm 16 and will take up the shock as this arm is swung inwardly. If desired, this stop or button 19 can be made of rubber or other cushion or spring material, to absorb and relieve impact shocks.

The arm 16 is preferably curved rearwardly and then laterally, as is best shown in Figure 1, and a leaf spring 20 is mounted on the carriage and has one end extending to bear against the forward side of the arm 16. A spring latch 21 is provided to releasably engage in notches 22 and 23 provided on the bearing portion of the arm 16 adjacent to the swinging mounting on pin 15, and this spring latch 21 will engage in the groove or notch 22 to hold the arm 16 in the extended position, and will engage in notch or groove 23 to retain the arm in the retracted or rearwardly extending and trailing position. This latch means is so formed that it will resist ordinary operative forces tending to swing the arm 16, but that any greater force will readily release the latch so that it can swing upon its mounting on pin 15.

A cross supporting shaft 24 is mounted to extend from one of the posts 4, or from any other suitable support, at a point along the length of the track rails 1 and 2 corresponding substantially to the end of the racing course of the dog racing track or course, and this supporting shaft is elevated to permit passage of the carriage 5. An arm 25 is swingably mounted upon the shaft 24 and has a supporting rod 26 telescopically fitted in an elongated opening 27 therein, a spring 28 being provided to urge said supporting rod 26 outwardly and to cushion shocks due to sudden inward movement of this supporting rod. The supporting rod 26 is bifurcated at its outer end, as at 29, and is provided with bearing portions to revolubly mount a contact wheel 30. A spring 31 is associated with the arm 25 in such manner that it will exert resilient force to normally swing this arm to substantially the position shown in Fig. 4, where the wheel 30 is raised above the elevation of the path of travel of the arm 16 and the spring 20.

An electromagnet 32 is mounted adjacent to the swinging end of the arm 25, and this arm has an armature 33 thereon to be attracted by the electromagnet 32 so that the arm 25 will be swung to substantially the position shown in Fig. 5, where the wheel 30 is disposed in position to engage the spring 20 and trip and swing back the arm 16, when the electromagnet has been energized. A suitable circuit connection, similar to that indicated at 34, can be employed to supply current from any suitable electric current source, and switch 35 can be included in this circuit to thus permit manual control of the circuit to energize and de-energize the electromagnet 32.

The supporting case structure 14 has an elongated opening 36 therein and a plunger rod 37 slidably fitted in this opening 36 urged by spring 38 into contact with the hub portion 39 of the arm 16, where this arm is swingably mounted on the pin 15. The hub portion 39 can be provided with a cam formation 40, and thus as the wheel 30 engages spring 20 sufficient excess pressure will be exerted against arm 16 to cause spring latch 21 to be disengaged from the notch or groove 22, in consequence of which the arm 16 will swing rearwardly as indicated in Fig. 2. As the arm swings a sufficient distance to bring the cam portion 40 past the end of plunger rod 37, this rod will engage with the cam formation to force the arm 16 to its full rearward position and to the relation in which the latch 21 engages in notch or groove 23. This spring pressed plunger rod 37 serves and acts to aid in holding the arm 16 in each of its positions for use.

As stated above, the trolley wires and contact shoes provide means through which the electric motor propelling the carriage or car 5 can be supplied with current for either forward or reverse travel of the carriage or car, and also it will be appreciated that this circuit arrangement permits provision for relay or electromagnetically operated brake means, or other form of brake mechanism, several of which are well known.

In some uses it may be found desirable to provide for extension or lengthening and shortening of that part of the arm 16 which carries the harness 18, to thus permit adjustment and movement of the rabbit or lure 17 to be carried a greater or less distance laterally from the trackways 1 and 2.

When the arm 16 is swung back the rabbit or lure 17 will be carried substantially over these tracks 1 and 2, and thus the lure will have substantially disappeared from proximity to the race course, thereby avoiding continuation of the luring of the dogs. If desired, a curtain, housing, or other shield can be provided, as at 41, in a position interposed to hide the lure when the arm 16 is swung to the inward position. By this construction and arrangement, the rabbit can be thrown to disappear from its extended side position, and thereby avoid the continuation of racing of the dogs. With this arrangement and construction the dogs will not be lured to continue beyond the end of the racing course, and thus likelihood of the dogs being hurt by racing beyond the end of the course, or by coming in contact with an extending lure or lure carrying arm, after the lure moving carriage has been stopped, is avoided.

With the modified construction illustrated in Figs. 7 to 11 inclusive, the supporting frame 42 is adapted to be fitted upon and supported and moved by a carriage or carrier structure traveling on a track, or otherwise moved along the extent of a dog racing course, and this supporting frame might conveniently be mounted upon and carried by a carriage structure similar to the carriage 5, mounted and traveling as hereinbefore described. This supporting frame 42 has thereon a pivot pin or standard 43, and a lure carrying arm 44 is pivotally and swingably mounted on the bearing pin or standard 43 so that it can be swung to a position to extend laterally from the carriage, substantially as indicated by the dotted lines at 45, or can be swung to a position extending substantially rearwardly or trailing from the supporting frame 42 as this is supported on the traveling carriage.

This lure carrying arm 44 is preferably made up as two or more tubular sections, 46 and 47, telescopically and slidably fitted together, and a spring 48 is connected between these two telescopically fitted tubular sections 46 and 47 in such relation that the spring normally exerts pulling force to retract the section 47 slidably within the section 46. The tubular extension section 47 may have a spline groove 49 therein, and a screw or other member 50 is carried by the arm section 46 and is received in this spline groove 49 to keep the extension portion 47 from rotating within the tubular arm section 46. At the outer end of the extension section 47 a lure carrier harness or other supporting means can be provided, as hereinbefore described, or of any other type.

The spring 48 normally exerts resilient pulling force to telescopically slide the extension section 47 into the arm section 46, and a cushion spring 51 is preferably provided within the section 46 adjacent to the pivot or mounting pin or standard 43 so that as the extension section 47 is drawn inwardly sharply under the impetus of the spring 48, inward movement will be stopped and will be cushioned by this spring 51.

As the spring 48 normally tends to retract or telescopically slide the extension section 47 into the arm section 46, it is necessary and desirable that means be provided to hold the retractable arm portion or extension 47 in the extended position, when the device is in use. Referring to Fig. 9, a catch or latch member 52 is pivotally mounted on the arm portion 46 with its latch end movable through an opening in this arm member 46 to a position to catch against the inner end of the retractable arm portion 47 and hold this arm portion 47 extended against the resilient retracting force exerted by spring 48. A substantially U-shaped link or arm structure 53 is associated with the latch member 52 after the manner of a bell crank, and a spring 54 is provided to pull upon the bell crank lever and urge the latch member 52 into the latching position. A substantially U-shaped link portion 55 is swingably mounted on the arm member or portion 46, and has an extension lever 56 projecting beyond the swinging or pivot mounting. A rod or cable 57 is connected with this arm at one end, and at its other end is connected with the bell crank arm 53 so that as the substantially U-shaped link or lever portion 55 is swung to exert drawing force upon the rod or cable 57, the latch member 52 will be raised to release from its engagement with the inner end of the extension arm portion 47.

An arcuate supporting trackway or rest 58 is provided on the supporting member 42 to extend substantially in an arc having as its center the pivot pin or standard 43 and serve as a rest for the portion 46 of the arm, and at its rear end this track or support portion 58 has a hook-like stop portion 59, a latch 60 being provided at the throat of this hook-like stop portion to function somewhat after the manner of a snap hook to retain the arm 46 in the rearwardly extending or trailing position. This latch portion 60 can be released manually when it is desired to swing the arm structure 44 to the laterally extending position as indicated at 45, and a spring 61 is preferably provided on the pivot pin or standard 43 to exert force upon the arm structure 44 to normally swing this arm to the full line position as shown in Fig. 7.

At the forward end of the arcuate and concentrically arranged or disposed supporting trackway 58, I provide a latch structure to hold the lure carrying arm in the extended position. This latch structure consists of a substantially U-shaped member 62 which is swingably mounted on its lower side, as at 63, upon the supporting member 42. This member 62 is pivotally or swingably mounted at 63 so that the open end thereof is disposed to receive the arm structure 44 when this arm structure is swung to the position indicated at 45, and a latch portion 64 is provided on the member 62 to engage with a latch plate 65 on the arm member 46. A spring 66 normally swings the latch member 62 to a position to engage and hold upon the latch plate 65. A rod or plunger 67 is slidably mounted in a suitable bearing with its rearwardly disposed headed end 68 disposed to be engaged by the arm structure 44 when this arm structure is swung to the position at 45, and a spring 69 is provided on the rod 67 to exert resilient pressure to initiate rearward swinging movement of the arm structure 44 immediately after the latch 64 is released from the latch plate 65, the spring 61 carrying through the full movement of the arm structure 44 from the operative to the inoperative positions.

The substantially U-shaped latch member 62 has a cam or track portion 70 carried on its upper arm in such relation that a stop or wheel 71 engaging therewith will depress this cam or track portion 70 and in consequence will swing the latch portion 64 of the member 62 downwardly against the pressure of spring 66 to release this latch end 64 from the latch plate 65. In Fig. 11 I have illustrated a convenient means for moving the trip wheel 71 into and out of the tripping position. As here shown, the wheel 71 is revolubly mounted at one end of a lever or arm 72 which is swingably mounted at bearing 73. A spring 74 normally exerts pulling force on the arm 72 to raise the trip wheel 71 above a position where it will engage with the cam or trackway 70. This tripping structure can be mounted at any desired point along the trackway on which the carriage supporting the supporting plate 42 is mounted to travel and the arm 72 can be manipulated to bring the tripping wheel 71 into the tripping position by any suitable means. In the present disclosure I have shown an electromagnet 75 adjacent to and above the outer swinging end of arm 72, which electromagnet can be connected in any desired circuit energized from any source and controlled by any suitable switch or other means. An armature 76 is mounted on the arm 72 in position to be attracted by the electromagnet 75, when energized, and consequently the arm 72 will be swung against the resilient force of spring 74 and the trip wheel 71 will be lowered or swung down to a position where it will come into tripping engagement with the cam or trackway portion 70.

When the wheel 71 trips the latch member 62 to release the latch portion 64 from the latch plate 65, the spring 69 exerts pushing pressure on the plunger rod 67 to bring the head 68 forced fully against the arm structure 44 and initiate rear swinging movement of this arm, the spring 61 carrying through the movement.

In the rearward swinging or retracting movement of the arm structure 44, it is desirable that the latch 52 be released so the extension arm portion 47 will be retracted by spring 48 telescopically into the tubular arm portion 46. With this in mind, I provide a roller 77 on the substantially U-shaped link portion 55, and mount a cam track 78 on the arcuate supporting track portion 58 in such position that as the arm structure 44 swings rearwardly this roller 77 will come into contact with the cam portion 78 and the lever 56 will be rocked to exert pulling force on rod or cable 57 to swing arm 53 and raise or release the latch 52.

While I have herein shown and described only certain specific embodiments of my invention and have suggested only certain possible modifications and changes and adaptations, it will be appreciated that many changes and variations can be made in the form, construction, arrangement, assembly, and association of the parts, and in the manner of use, without departing from the spirit and scope of my invention.

I claim:

1. A dog racing apparatus comprising, with a track rail structure, a carriage mounted to travel on said track rail structure, a lure carrying arm swingably supported by said carriage to be swung to a laterally extending relation to present a lure in dog luring relation and to be swung to a retracted position to remove the lure from dog luring relation, and shock cushioned means adjacent to the track to engage said arm to move the arm from its extended to its retracted position.

2. A dog racing apparatus comprising, with a trackway extending alongside of a dog racing course, a carriage mounted to travel on said trackway, an arm swingably mounted on said carriage, a lure supported by said arm, said arm being swingable to an extended position to present the lure to urge dogs along the racing course and to a second position to remove the lure from proximity to the race course, means to hold said arm in each of the two positions, a swingably mounted arm placed adjacent to the track rails substantially at a point along the race course where the lure is to be withdrawn, a contact wheel carried by said arm to be interposed in one relation of the arm to swing back the lure carrying arm, and means to move said swinging arm to bring the wheel into and out of operative positions.

3. A dog racing lure apparatus comprising, a movable lure carriage, a lure carrying arm structure swingably mounted upon said carriage to be swung to one position to extend laterally and carry the lure in dog luring relation and to be swung to another position to retract the lure from dog luring relation, and means to reduce the length of extent of said arm when retracted.

4. A dog racing lure apparatus comprising, a movable lure carriage, a lure carrying arm structure pivotally and swingably mounted on said carriage to be swung to a position of use extending laterally and to be swung to another position to trail from the carriage, means normally exerting force to swing said arm to the trailing position, latch means to hold said arm in the laterally extending position for use, trip means to release said latch means to allow the laterally extending arm to be swung to the trailing position, said arm structure having a retractable extension section to carry a lure, means normally exerting force to retract said extension section, means to releasably hold said extension section in extended relation, and means automatically tripped by rearward swinging movement of the arm structure to release the latch means thereof and allow retraction of the extension section.

ROY H. ALLDRITT.